Dec. 22, 1970 R. E. HINELINE 3,549,442
METHOD OF BUILDING A TIRE CASING FROM A STRIP OF RUBBER
Filed July 26, 1967 4 Sheets-Sheet 1
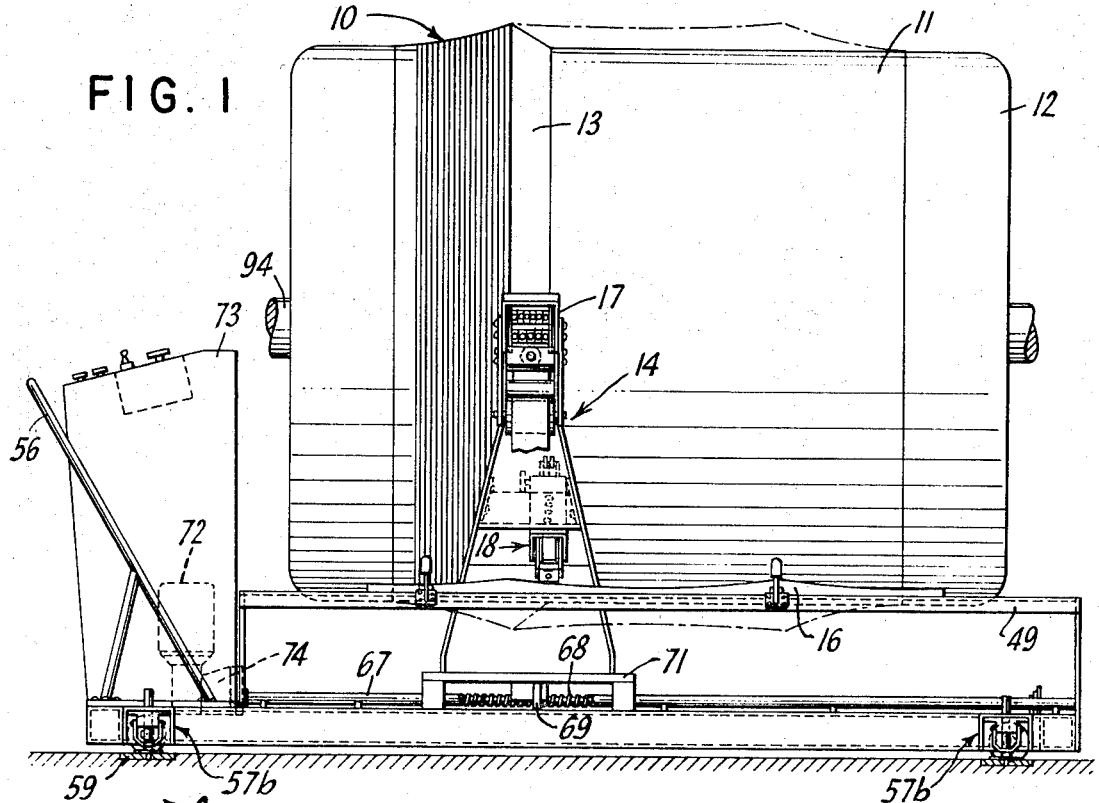
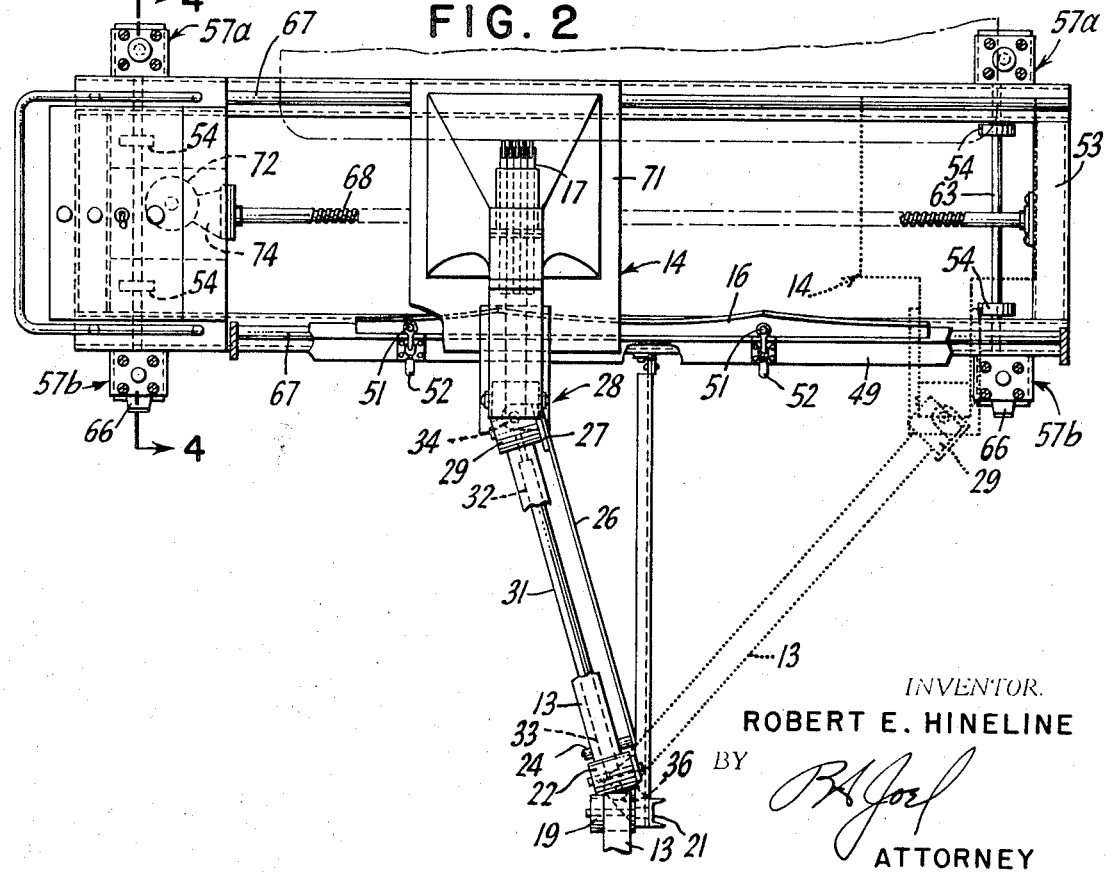
INVENTOR.
ROBERT E. HINELINE
ATTORNEY Dec. 22, 1970 R. E. HINELINE 3,549,442
METHOD OF BUILDING A TIRE CASING FROM A STRIP OF RUBBER
Filed July 26, 1967 4 Sheets-Sheet 2
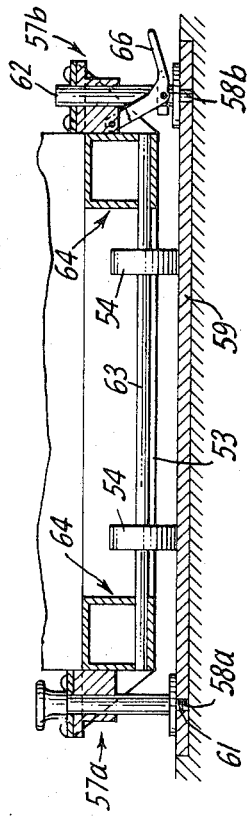
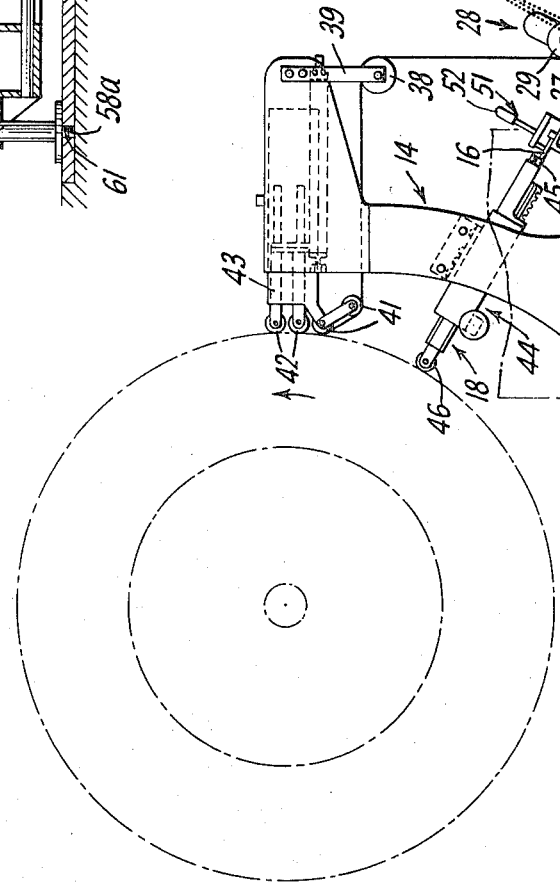
INVENTOR.
ROBERT E. HINELINE
BY
ATTORNEY

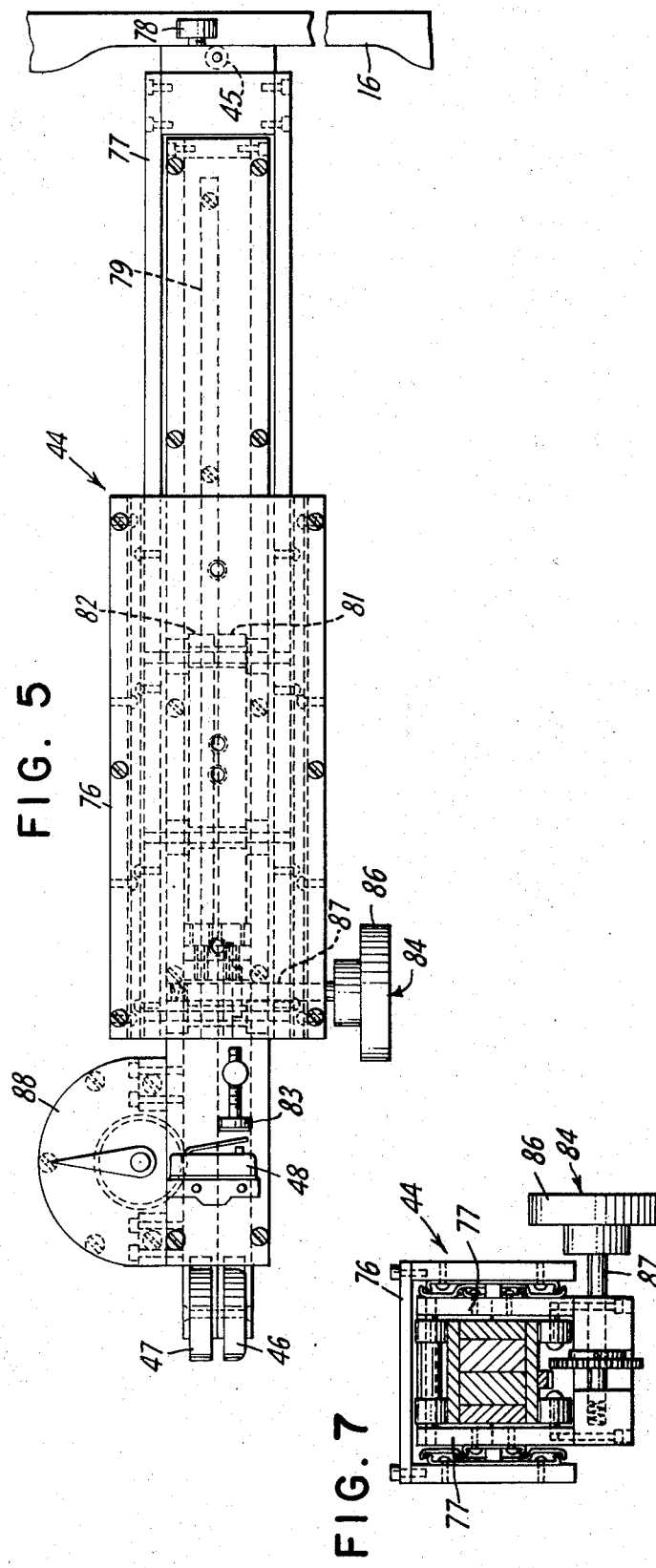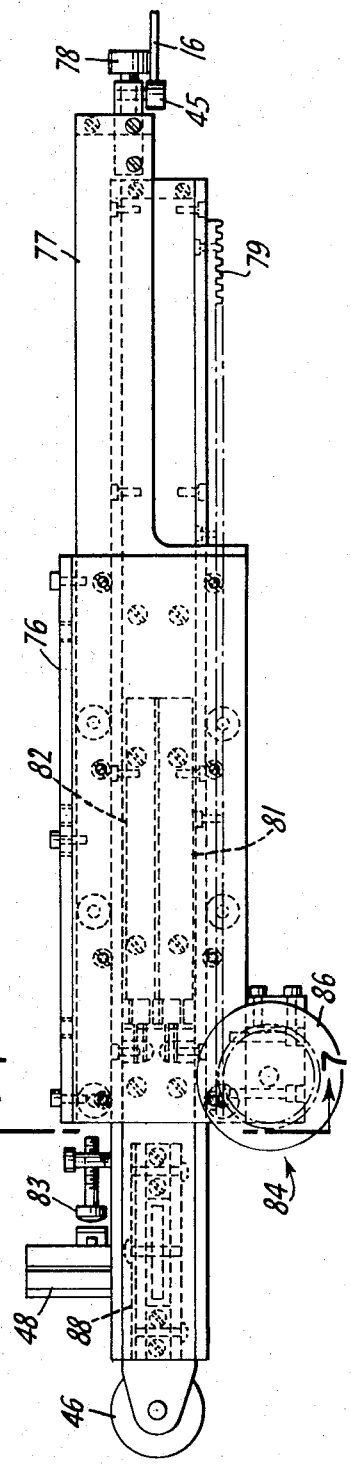

Dec. 22, 1970   R. E. HINELINE   3,549,442
METHOD OF BUILDING A TIRE CASING FROM A STRIP OF RUBBER
Filed July 26, 1967   4 Sheets-Sheet 4

INVENTOR.
ROBERT E. HINELINE
BY
ATTORNEY

United States Patent Office 3,549,442
Patented Dec. 22, 1970

3,549,442
METHOD OF BUILDING A TIRE CASING FROM A STRIP OF RUBBER
Robert E. Hineline, Akron, Ohio, assignor to American Machine & Foundry Company, a corporation of New Jersey
Filed July 26, 1967, Ser. No. 656,283
Int. Cl. B29h *17/20*
U.S. Cl. 156—117                    1 Claim

ABSTRACT OF THE DISCLOSURE

A method of building tires, such as new off-the-road tires, on a drum arrangement whereby a strip of rubber is placed thereon as the drum continually rotates. The apparatus includes an application and sensing arm which guides the material onto the drum in a predetermined pattern in accordance with a straight line template. The application and sensing arm moves in a straight line across the surface of the building drum to build a tire contour in accordance with the template configuration. The apparatus is portable and may be removed from a building station when not required and thus used to serve a number of building stations.

BACKGROUND OF THE INVENTION

This invention relates to tire manufacture and particularly to an apparatus for applying a predetermined tread thickness to a green tire casing. The present invention is particularly suited to the manufacture of new off-the-road tires and while portions of a similar machine and process are broadly disclosed in my prior filed co-pending application S.N. 576,888, filed Sept. 14, 1965, the present inventon discloses in detail a new and improved method and apparatus to produce new off-the-road tires. This requires a distinctly different machine from the retread tire machine since new tires are produced on a rotating stationary drum rather than a movable hub.

Other apparatus for building a tire tread by applying a ribbon to a base structure are disclosed in Pats. 3,268,-380 to L. J. Guichon et al., 3,223,572 to R. L. Holloway et al., and 3,177,918 to R. G. Holman. The present invention, however, is custom designed to produce a particular product such as new off-the-road tires and is readily distinguishable over the aforementioned patents. There is no machine which currently produces off-the-road tires in the unique and economical manner which applicant proposes herein. Furthermore, the apparatus of the present invention is a portable, self-contained unit which can be moved to any drum station in a manufacturing facility.

SUMMARY OF THE INVENTION

Accordingly, the object of this invention is to provide a new and improved method and apparatus for producing new off-the-road tires.

With the above and other objects and advantages in view, the present invention pertains to a unique method and apparatus for producing tires such as large size off-the-road tires. The apparatus comprises a drum arrangement whereby a strip of rubber is positioned thereon as the drum continually rotates. The apparatus includes an application and sensing arm which guides the extruded material onto the rotating drum in accordance with a predetermined straight line template. During the tire building operation the application and sensing arm moves in a straight line across the surface of the building drum to build a tire contour in accordance with the template configuration.

BRIEF DESCRIPTION OF THE DRAWINGS

The features of the present invention will be more clearly understood when viewed in conjunction with the accompanying drawings, wherein:

FIG. 1 is a front view of the new and improved apparatus of the present invention for producing off-the-road tires;

FIG. 2 is a top view of the subject apparatus with portions omitted in order to more clearly illustrate the operation thereof and with the movement of the application and sensing arm shown in phantom;

FIG. 3 is a side view of the present invention;

FIG. 4 is a broken-away view of the base portion of the apparatus taken along the lines 4—4 of FIG. 2;

FIG. 5 is a top view of the sensing head arrangement;

FIG. 6 is a side view of said sensing arm arrangement;

FIG. 7 is an end view of the sensing arm arrangement;

DESCRIPTION OF THE PREFERRED EMBODIMENTS

Figure 8:
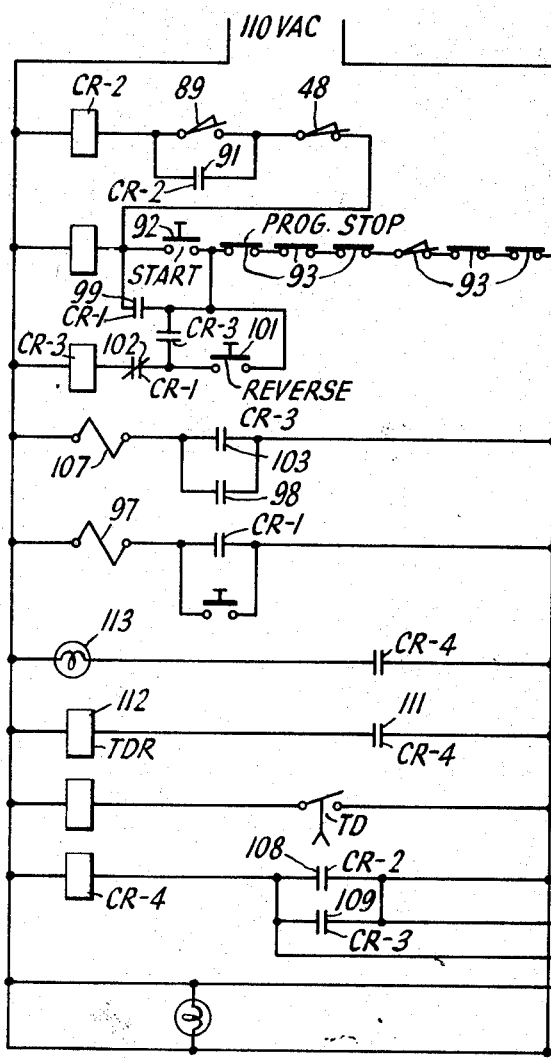
FIG. 8 is a schematic representation of the electrical circuit employed in the present invention.

Referring now to the drawings, the invention comprises an apparatus for building new off-the-road tires 10 on a base structure such as a green tire casing 11 which is mounted on a drum arrangement 12. A strip of rubber 13 which is locally extruded from a cold feed extruder, not shown, is placed upon the drum 12 in a predetermined manner in order to form the finished tire contour which is shown in phantom in FIG. 1. The apparatus includes an application and sensing arm 14 which guides the strip 13 onto the drum 12 in accordance with a straight line template 16. The application and sensing arm 14 moves in a straight line across the surface of the rotating building drum 12 to build a tire contour conforming to the template configuration. As the strip 13 is applied to the casing 11 by an application head 17 mounted on the arm 14, it is continuously monitored by a sensing head 18 which is also mounted on the arm 14 in a fixed relation to the application head 17.

As shown in FIGS. 2 and 3 the extruded strip 13 is fed to the tire building machine by means of an overhead conveyor not shown which includes a gate or other means for feeding the strip to the building apparatus. Since the present apparatus is self-contained and portable in nature it may be used to feed several machines from a single cold feed extruder. In the illustrated embodiment, the strip 13 passes over roller 19 which is mounted on bracket 21 and then onto roller 22 which is mounted on the pivotal bracket arrangement 23. The strip 13 passes over the pivotal dancer roller 24 mounted on dancer arm 26 at one end and affixed to the swivel bracket 27 which in turn is coupled to a potentiometer arm arrangement 28 for regulating the speed of the drum 12 to prevent excess slack from accumulating in the strip feed.

Roller 22 is coupled to roller 29 on the potentiometer arrangement 28 by means of the telescoping arm 31 which is coupled at its ends 32 and 33 to the respective rollers 29 and 22 through the bearing arrangements 34 and 36 respectively. Thus, the rollers 22 and 29 are maintained in a parallel relationship while the application and sensing arm 14 traverses the drum 12. A counter weight arm 37 is also provided for the dancer arrangement.

The strip 13 passes over roller 38 which is mounted to the application head 17 by means of bracket 39 and is then fed to the plurality of application rollers 41 which apply the strip to the casing 11. A plurality of stitching rollers 42 mounted in the retractable stitching head 43 stitch the rubber strip to the casing 11 at approximately the center portion of the drum 12. A sensing head 44 is mounted to the arm 14 below the application head 17 with the sensing rollers 46 being aligned with the trailing edge of the strip 13. The sensing head 44 which will be described later in greater detail includes a cam follower 45 which follows the outline of the template 16. The sensing head 44 continuously contacts both the template and the applied strip 13 and actuates a motor 72 to move the arm 14 when the desired tread contour has been reached at the particular position on the tire. The applied strip 13 makes an approximately 330° wrap before the sensing roll 46 senses the increase in gage. Since the tire building drum 12 is generally concentric, no spin switch such as employed in my co-pending application S.N. 576,888 is required. The traversing movement of the arm 14 is halted when a switch 48 located on the sensing head opens signifying that the finished tread contour has not been reached at that particular point.

The template 16 is mounted on a member 49 and held in position by one or more locking members 51. The locking members 51 include a handle portion 52 which may be readily gripped to either secure or release the template 16 from the member 49. In the ordinary instance, the template 16 will be full size and may be dismounted in order to compare the template contour with that of the finished tire. A variety of templates 16 may be stored in a particular plant in order to permit the manufacture of various tire gages with the same equipment. The apparatus as described herein may be used in conjunction with drums 12 which vary from about 32 inches in diameter to about 62 inches in diameter.

The invention as thus described may comprise a portable unit which includes a frame portion 53 which is supported by a plurality of rollers 54. The apparatus may be readily located in a building position by rolling said apparatus into position using the transporting handle arrangement 56. When the unit is properly positioned the four floor jacks 57a and 57b engage predetermined apertures 58a and 58b in the floor plate 59. The two forward floor jacks 57a include threaded shafts 61 which engage threaded apertures 58a in the floor plate 59. The rear floor jacks 57b include pins 62 which engage the apertures 58b in the floor plate 59. This arrangement is more clearly shown in FIG. 4 which also illustrates rollers 54 mounted on shaft 63 and journaled at its ends in bearing arrangements 64. The floor jack portions 57a and 57b extend outwardly from the frame portions 53 and the rear floor jacks include a position lock 66.

The application and sensing arm is slidably mounted on a pair of guide rails 67 and is driven back and forth therealong by a drive screw 68 which engages a downwardly extending portion 69 on the base 71 of the arm 14. The drive means for the arm 14 comprise a motor 72 which may be mounted within the control panel 73 at one end of the apparatus and coupled to the screw 68 through a gear reduction means 74. In a typical embodiment the motor may comprise a ¼ horsepower D.C. motor and the gear reduction arrangement may be on a 10:1 ratio. A typical drive screw may comprise a 1″ ball screw having a ¼″ pitch. Since a 10:1 gear reduction does not provide self-locking, an A.C. brake may be provided in the subject embodiment. Furthermore, since an A.C. brake is not rated for the number of stops that will normally occur during operation, a dynamic braking resistor may be used for stopping in cooperation with a time delay relay which activates the A.C. brake for static holding, see FIG. 8.

The sensing head 44 as shown in FIGS. 5, 6 and 7 comprises a frame portion 76 which is mounted to the application and sensing arm 14. A cam follower 45 is mounted to the slide 77 at one end thereof and is maintained in continuous contact with the template 16. In fact, a second roller 78 also rides on the template 16. The slide 77 is connected to a rack 79 which moves back and forth in accordance with the template configuration.

A sensing roller 46 and a stitching roller 47 are mounted to the air cylinders 81 and 82 respectively at the other end of the sensing head 44. A switch 48 is mounted to be engaged by an adjustable stop 83. When the sensing switch 48 is closed the drive motor 72 is activated to cause the application and sensing arm to move along the guide rails 67 until the switch 48 is opened. The arm 14 remains in place as layers of ribbon 13 are applied to the drum casing 11 until the sensing roller 46 closes the sensing switch 48. This sequence is continuously repeated in order to build the desired tire contour. In operation, the sensing roller 46 is positioned in line with the trailing edge of the applied rubber ribbon 13 and the sensing switch is provided with a differential travel of approximately 1/32 of an inch. A stop limit switch may be provided on the sensing arm to ride on the template 16 in order to stop the program.

The sensing head is also provided with a hand adjustment 84 which includes a handle 86 coupled to a spring-loaded shaft 87 to initially position the sensing roller 46 according to an indication which appears on the scale 87.

Figure 9:
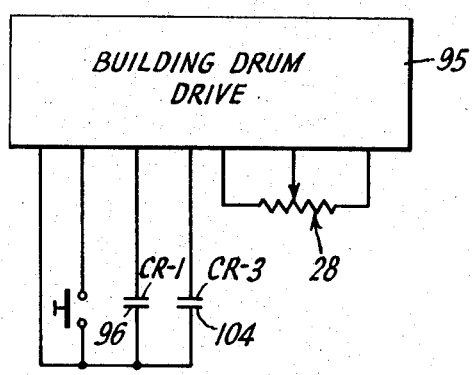
FIG. 9 illustrates the electrical circuit for the drum control arrangement.

Referring to the electrical drawings of FIGS. 8 and 9 the spin switch 89, if provided, is closed once during each revolution and if at that time the sensing switch 48 is open, control relay CR-2 will not be operated. Relay CR-2 controls the drive motor 72 which moves the application arm 14 in a straight line opposite the drum surface. Consequently, the motor 72 will not be operated if the sensing switch 48 is open and the application arm 14 will continue to apply the rubber strip 13 to the same portion of the tire casing 11. On the other hand, the sensing switch 48 will close if the sensing roller detects adequate gage on the casing surface corresponding to the template configuration. The drive motor 72 will be operated by the closing of the spin switch 89 which locks across contacts 91 of relay CR-2 causing the roller 46 to move across the strip surface until a point where the next strip 13 is required to fulfill the contour requirements. The switch 48 will then open, stopping the traversing movement of the application arm 14.

As shown in FIGS. 8 and 9 of the drawings, program control relay CR-1 is operated when the start switch 92 is closed. The circuit is completed through a plurality of switches 93 which are used for various control purposes. Relay CR-1 controls the drum driving means 95 which drives shaft 94 through contacts 96 and also the air solenoid 97 for the sensing cylinders through contacts 98. Contacts 99 of relay CR-1 provide a locking arrangement after the start switch 92 is released.

Control relay CR-3 is operated by the reverse switch 101 through normally closed contacts 102 of relay CR-1. The relay CR-3 also operates the solenoid 97 through contacts 103 and the drum driving arrangement through contacts 104. In the circuit drawing, the conventional connections with the driving motor 72 are not shown in detail since such arrangements are well-known and conventional in the prior art. The motor control is merely indicated at 106 and may, for example, include a Boston Gear Ratiotrol with provision for an A.C. brake.

The application and stitching solenoid 107 is also controlled through contacts 108 of relay CR-1 and control relay CR-4 is operated through contacts 108 of CR-2 and 109 of CR-3. Contacts 111 of control relay CR-4 operate the time delay relay 112 and the light 113.

Figure 10:
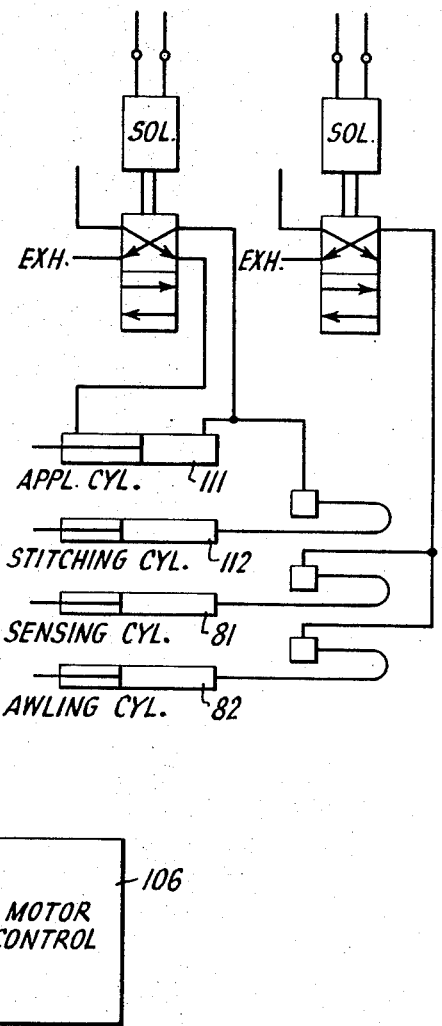
FIG. 10 illustrates the pneumatic control circuit for the present invention.

The fluid drive control arrangement is shown schematically in FIG. 10. Solenoid 107 controls the application cylinders 111 and the stitching cylinders 112 while solenoid 97 controls the sensing cylinders 81 and awling cylinders 82. The latter cylinders 81 and 82 are connected in parallel while the application and stitching cylinders 111 and 112 are connected in series.

The invention, as described above, comprises a new and improved apparatus for producing primarily off-the-road tires although the concepts embodied herein may be employed to produce other tires as well. The ribbon size customarily employed is 3 inches x .180 inch; however, variations in width up to ⅜ inch and thickness up to .05 inch may be readily handled. It is to be noted that the present invention is also adaptable for programming with other arrangements than a straight line template and numerous other programming means may be employed to produce the desired tire contour. The self-contained portable nature of the subject apparatus is a distinct advantage over present commercially available equipment and permits greater flexibility in the use of plant equipment.

What has been described above are merely illustrative examples of the application of the principles of the invention. Numerous other arrangements may be readily devised by those skilled in the art which will embody the principles of the invention and fall within the spirit and scope thereof.

What is claimed is:

1. A method of making a tire casing, comprising the steps of:

feeding a continuous strip of tread material to a rotating tire casing, winding the strip on said casing in a series of overlapping turns, sensing the strip position after it has been applied to the casing, developing an electrical signal in response to the sensing of a predetermined tread contour at the sensed position, and coupling said electrical signal to a drive motor to move the tread feeding and winding to a new portion of the rotating tire casing.

References Cited

UNITED STATES PATENTS

| | | | |
|---|---|---|---|
| Re. 25,349 | 3/1963 | Hanson | 156—130 |
| 3,268,380 | 8/1966 | Guichon et al. | 156—130 |
| 3,418,191 | 12/1968 | Dieckmann et al. | 156—130X |

BENJAMIN A. BORCHELT, Primary Examiner

S. C. BENTLEY, Assistant Examiner

U.S. Cl. X.R.

156—130